United States Patent [19]

Mesters et al.

[11] Patent Number: 4,711,773

[45] Date of Patent: Dec. 8, 1987

[54] PROCESS FOR THE PRODUCTION OF HYDROGEN

[75] Inventors: Carolus M. A. M. Mesters, Utrecht; John W. Geus, Bilthoven; Eugène G. M. Kuijpers, Apeldoorn, all of Netherlands

[73] Assignee: VEG-Gasinstituut N.V., Netherlands

[21] Appl. No.: 28,001

[22] Filed: Mar. 19, 1987

Related U.S. Application Data

[63] Continuation of Ser. No. 899,799, Aug. 25, 1986, abandoned, which is a continuation of Ser. No. 667,125, Nov. 1, 1984, abandoned.

[30] Foreign Application Priority Data

Nov. 4, 1983 [DE]  Fed. Rep. of Germany ....... 3339865

[51] Int. Cl.$^4$ ................................................. C01B 2/10
[52] U.S. Cl. .................................. 423/655; 423/656; 502/244; 502/345
[58] Field of Search ............... 423/655, 656; 502/244, 502/345

[56] References Cited

U.S. PATENT DOCUMENTS

| 1,696,644 | 12/1928 | Patrick | 502/244 |
| 1,843,540 | 2/1932 | Casale | 423/655 |
| 3,668,148 | 6/1972 | Van Beek et al. | 502/244 |
| 3,668,149 | 6/1972 | Geus et al. | 502/244 |
| 3,850,841 | 11/1974 | Aldridge et al. | 423/655 |
| 3,899,577 | 8/1975 | Sugier | 423/656 |
| 4,113,658 | 9/1978 | Geus | 423/656 |
| 4,128,730 | 12/1978 | Reich | 423/656 |
| 4,190,560 | 2/1980 | Geus et al. | 502/244 |

FOREIGN PATENT DOCUMENTS

| 651047 | 1/1965 | Belgium | 423/656 |
| 656674 | 6/1965 | Belgium | 423/656 |
| 299492 | 10/1928 | United Kingdom | 423/656 |
| 1068809 | 5/1967 | United Kingdom | 423/656 |
| 1080295 | 8/1967 | United Kingdom | 423/656 |
| 1144494 | 3/1969 | United Kingdom | 502/244 |

OTHER PUBLICATIONS

Publication, Ammonia, edited by A. V. Slack and G. Russell James, 1974, Marcel Dekker, Inc., New York, pp. 28, 29.
Dissertation, Preparation and Carbon Monoxide Oxidation Activity of Supported Copper (Oxide) Catalysts, by J. Van Der Meijden, 1981.

Primary Examiner—John Doll
Assistant Examiner—Wayne A. Langel
Attorney, Agent, or Firm—Schweitzer & Cornman

[57] ABSTRACT

A process for the production of hydrogen with simultaneous formation of carbon dioxide by reacting carbon monoxide with steam at elevated temperatures in the presence of a catalyst which essentially consists of a refractory oxidic carrier having a high specific surface area loaded with metallic copper of a purity of more than 90% by weight, a fraction of at least 1% by weight of said metallic copper calculated as % by weight of the total weight of the copper and carrier being present as particles of a size of less than 20 nm.

21 Claims, No Drawings

PROCESS FOR THE PRODUCTION OF HYDROGEN

This is a File Wrapper Continuation Application of Application Ser. No. 899,799, filed Aug. 25, 1986 which is itself a File Wrapper Continuation Application of Application Ser. No. 667,125, filed Nov. 1, 1984, both now abandoned.

This invention relates to a process for the production of hydrogen with simultaneous formation of carbon dioxide by reacting carbon monoxide with steam at elevated temperatures in the presence of copper containing catalysts.

The above process is known as a shift reaction and is widely used in technology. This process is of particular importance in the gasification of coal, and in the production of methanol and of ammonia. This prior art relating to this reaction is described, among others, in a summary in CATAL. REV.-SCI. ENG., 21 (2), 258 to 380 (1980). The reaction is carried out in the presence of catalysts. There are substantially three types of catalysts. One type includes iron-based catalysts. These are the so-called high-temperature shift catalysts for which reaction temperatures of about 320° to 450° C. are required. Such catalysts can tolerate small quantities of sulphur in the reaction mixture. However, they suffer from the fundamental disadvantage that they are not very active at low temperatures.

Copper-based catalysts are a further type of catalyst for this reaction. These are substantially copper/zinc oxide catalysts. These are so-called low temperature shift catalysts which suffer from the unusual disadvantage that they are only stable up to a relatively low temperature. They sinter at temperatures above 260° C. and irreversibly lose their activity. The reaction rate is further reduced by physical transport problems. However, it is difficult to avoid relatively high temperatures in the shift reaction as the shift reaction is exothermic and the temperature in the reactor rises as a result of this.

The third type of catalyst is provided by the cobalt- and molybdenum-based catalysts which are active at relatively low temperatures but suffer from several disadvantages. They are very expensive owing to their poor availability.

The selectivity for the shift reaction is not very good. It is necessary to use additional quantities of steam in the feed gas mixture to maintain the temperatures in the tolerated range as they otherwise catalyse the undesirable methanation reaction.

According to the prior art, only those copper catalysts which contain zinc oxide as essential carrier material have a high initial activity at low temperatures between about 200° and 260° C. and do not substantially loose this during the subsequent implementation of the process. However, these catalysts of the prior art suffer from substantial disadvantages. The catalyst precursors are present in the oxidized form in each case: CuO/ZnO, while the active catalyst has to be in a reduced form: Cu/ZnO. The activation process includes a reduction treatment at about 230° C. in an atmosphere of 2% $H_2$ in $N_2$ over a period of several days. This reducton has to be carried out extremely carefully as the formation of metallic zinc has to be prevented as this would react with the copper with formation of copper-zinc alloy which would cause irreversible deactivation of the catalyst.

Even if this treatment to produce the catalyst is carefully carried out with success, this catalyst is particularly sensitive to two processing conditions, that is temperature excursions or an excessive reduction potential of the reactants. The copper particles on the zinc oxide carrier have a great tendency to coalesce at elevated temperatures, and larger particles are formed resulting in an increased deactivation of the catalyst. For this reason, the temperature may not exceed 260° C. or 280° C. As substantial quantities of heat are released when carrying out the process, and particularly if there are 5 to 10% by volume CO or more in the inlet gas mixture, steam has to be added to prevent an excessive temperature rise in the catalyst bed. This is obviously a disadvantage. However, steam always has to be present in the inlet gas mixture even if the temperature in the catalyst bed is low, to maintain a certain $H_2O/H_2$ ratio which is required to prevent a reduction of the catalyst carrier as explained above. These factors substantially limit the practical operation of the process and the overall efficiency thereof.

The present invention is aimed at the improval of the shift process, and more particularly to carry it out in the presence of those catalysts which have a good selectivity for the shift reaction, permit higher temperatures in the reactor and enable the quantity of steam in the inlet gas mixture to be held as low as possible. Furthermore, the reaction rate should not be reduced by physical transport problems in the catalyst.

It is the aim of the present invention to avoid the above-mentioned problems in the production of hydrogen from carbon monoxide using copper catalysts.

According to the present invention this aim can be met if in a process the production of hydrogen with simultaneous formation of carbon dioxide by reacting carbon monoxide with steam at elevated temperatures in the presence of a catalyst containing more than 1% by weight of copper based on the total weight of the catalyst, the catalyst essentially consists of a refractory oxidic carrier having a relatively high specific surface area loaded with metallic copper of a purity of more than 90% by weight, a fraction of at least 1% by weight of said metallic copper, calculated as % by weight of the total weight of the copper and carrier being present as particles of a size of less than 20 nm.

In other words, it is very essential for the invention, that the copper catalyst contains a sufficient weight fraction of small copper particles, furthermore the copper must be sufficiently pure, while also it is essential that the carrier is a refractory oxidic carrier. Zinc oxide, which is known in the state of the art, is not refractory. It basically does not allow the establishment of a catalyst structure (as well as the porous structure) as we define here because of preparation requirements. In addition, it is much more liable to deactivation by sintering of the copper and/or the zinc oxide support and to changes in process conditions than is the case with the catalyst according to our invention, for reasons and under circumstances that we have described. The presence of zinc or its oxide in the catalyst must therefore be limited to below 15%, more preferably below 10% and even more preferably below 5% by weight of the total weight of the catalyst i.e. active metal plus carrier. Small amounts of zinc oxide may not harm the invention, but preferably they should be essentially absent, i.e. below 2% by weight of the total weight of the catalyst.

Our invention allows operation of the hydrogen production process by using the carbon monoxide shift conversion, with a flexibility that was heretofore unknown.

First, the activation procedure of our catalyst is easier because neither hydrogen partial pressure, nor temperature of the catalyst during reduction, are very critical. The catalyst of the invention can withstand temperatures of up to 500° C. or even 600° C. so that temperature excursions are not fatal. This also holds for the operation of the process, though it is generally preferred not to exceed a temperature of about 500° C. in the catalyst bed. The refractory oxidic carrier of the invention should preferably have a relatively high surface area of more than 30–50 $m^2$/gram, preferably more than 100 $m^2$/gram, even more preferably higher than 200 $m^2$/gram. This does not hold true for the carrier per se, but refers to the carrier in the active catalyst.

Another important difference between the catalysts according to the present invention and the catalysts according to the present state of the art, is that the copper particles in our catalyst are very well accessible to the gas phase and therefore the overall reaction shows little diffusion limitation. This results from the fact that in our invention catalysts are used which preferably are prepared by deposition-precipitation in order to obtain a homogeneous distribution of very small active copper particles, but without the creation of a large micropore volume in the carrier. In the catalyst of the invention, pores in the refractory oxidic carrier are relatively short and wide, whereas catalysts in the state of the art for this reaction, are 'microporous', i.e. they have a relatively large micropore volume, of long and narrow pores.

In our invention, the volume of micropores of a diameter less than 5 nm in the catalyst is less than 10%, preferably less than 5% of the total pore volume of the catalyst.

The carrier material that is much preferred is silica. Furthermore, it is preferred that the silica used is of high purity, of more than 95% by weight, even more preferred over 98% by weight. Another attractive carrier material is magnesia. This should also preferably be of high purity, of more than 95% by weight, more preferred over 98% by weight.

A very useful silica carrier is Aerosil (=Registered Trade Mark of the Degussa company, FRG).

The copper present as small particles on the carrier should be of sufficient purity. Preferably this should be more than 95% by weight more preferred over 98% by weight, or even more preferred over 99.5% by weight.

The size of the copper particles is also very important in this respect, that a sufficient amount of very small copper particles should be present on the carrier. When the major part of the copper in the catalyst is present in the form of very small particles, this is very useful for the invention, but it is not absolutely necessary. The catalyst according to the invention should have a sufficient loading with small copper particles, while the presence of a certain amount of bigger particles does not harm. However, a very surprising effect of the catalyst in the invention, is that the catalyst activity rises in a more than linear manner with the specific copper surface due to the decrease in particles size. Otherwise stated, the very small particles as defined hereafter contribute mainly to the catalyst activity, while the bigger particles contribute relatively little to the overall conversion. It is therefore preferred that at least 5%, preferably more than 10%, and even more preferably over 20% by weight of said metallic copper calculated as % by weight of the total weight of the copper and carrier is present as particles of a size of less than 20 nm. Particles of a smaller size than 20 nm give an even better performance of the catalyst in the process. It is therefore preferred, that at least 5% by weight of said metallic copper calculated as % by weight of the total weight of the copper and carrier is present as particles of a size of less than 10 nm, preferably less than 7 nm.

Higher loadings with these mentioned very small particles are very favourable in the invention.

It is therefore preferred that at least 10%, more preferably over 20% by weight of said metallic copper calculated as % by weight of the total weight of the copper and carrier is present as particles of a size of less than 10 nm, preferably less than 7 nm. The catalyst produced in the present invention is described in detail in the dissertation by Johannes van der Meijden (Utrecht, 1981), "Preparation and carbon monoxide oxidation of supported copper oxide catalysts".

The above dissertation relates to the oxidation of carbon monoxide with molecular oxygen. There is, however, no indication that the catalysts could be used for the shift reaction in which carbon monoxide is reacted with steam and the opinion was hitherto prevalent that ZnO was a substantial constituent of the catalyst. Pure copper is not usable as a catalyst for the shift reaction as it has an extremely low activity for this reaction. Finely divided silicon dioxide which is used as carrier for the catalyst according to the invention is inactive as such as a catalyst for the shift reaction.

There are indications in the relevant literature that the conversion of carbon monoxide with steam takes place via basic metal oxides according to the so-called formiate machanism, hydrogen formiate being formed on the surface of the oxide, which then decomposes into hydrogen and carbon dioxide. The hydrogen formiate splits into hydrogen and carbon monoxide via acid oxides. For this reason it is not to be expected that carbon monoxide will convert according to the shift reaction via finely divided silicon dioxide and other acidic oxidic materials. It is therefore surprising that the catalyst used according to the present invention catalyses the shift reaction with very high activity and furthermore within a very wide range for the carbon monoxide steam ratio.

It is very surprising in view of this prior art that the catalysts used according to the present invention, containing the metallic copper in reduced form as active catalyst component on a refractory oxidic carrier, catalyse the shift reaction in such an effective manner as will be explained in more detail in the following.

Finely divided silicon dioxide is used as a possible carrier for the catalyst used in the present invention. A silicon dioxide carrier having a specific surface area of more than 50 $m^2$ per gram is preferably used. Commercially obtainable products may be used which are based on kieselguhr, that is natural products, or synthetically produced finely divided silicon dioxide, as are, for example, commercially obtainable under the Trade Mark Aerosil. If kieselguhr is used, it has a specific surface of from about 10 to 15 $m^2$. The particles break up in the production of the catalyst and a much larger surface area of from about 100 to 150 $m^2$ per gram is obtained. The quantity of metallic copper on the catalyst used according to the present invention may vary within wide ranges. As explained above, the quantity should at least be 1% by weight based on the total weight of the catalyst as excessive quantities of catalyst otherwise have to be used. Consequently, in practice, the quantity should be at least 5% by weight, preferably at least 10% by weight and more preferably at least 20% by weight of metallic copper, based on the total weight of the catalyst. The upper limit of the load of the carrier with catalyst is calculated from the surface area of the carrier and the processing conditions, under which the catalyst is produced. An excessive loading of the carrier has also to be avoided, which would cause the copper particles to produce agglomerates. Consequently, it is effective if the upper limit of the loading is about 60% by weight, preferably, about 40% by weight, based on the total weight of the catalyst. The size of the copper particles and the number thereof may be seen using an electron microscope, as described, among other things, in the above-mentioned dissertation by van der Meijden.

The catalyst used according to the present invention should have a high specific surface area of copper accessible to the gas phase which amounts to at least 20 $m^2$ per gram of the metallic copper of the catalyst. This specific surface area preferably amounts to at least 50 $m^2$ per gram of the metallic copper. The upper limit is not particularly essential for carrying out the shift reaction. The specific surface area of the metallic copper which is accessible to the gas phase can be measured by the methods listed by van der Meijden in the above dissertation and described, for example, by J. J. F. Scholten, J. A. Konvalinka—Trans. Far. Soc. 65, (1969), 2465. These methods give similar results which generally differ from each other by not more than about 5%. The above figures relating to the specific surface area which is accesssible to the gas phase should be understood as also including the error limits produced by the various methods of determination and calculation.

Processes for producing the catalyst used according to the present invention are described in detail in the above-mentioned dissertation by van der Meijden (page 60). It can generally be said that a catalyst is used according to the present invention which is obtained in that copper compounds are precipitated in a solution which contains copper ions and the refractory oxidic carrier suspended in finely divided form with heating and a relatively long period of intensive stirring by reaction with hydroxyl ions and pH value of from 3.5 to 6 and the loaded carrier is separated from the solution, dried, calcinated and reduced. The copper ions present in the solution originate from soluble copper salts such as copper nitrate, copper perchlorate, etc. The temperature at which the suspension is heated for precipitation depends on the specific method of precipitation used. If precipitation is effected by decomposing urea or the hydroxyl ions formed thereby the temperature is from about 80° to 100° C. and effectively about 90° C., if other methods of precipitation are used, in which it is not necessary to specify the temperatures for decomposing hydroxyl ion-producing compounds, the temperatures of precipitation may also be lower than this. Intensive stirring is essential so that the particles of the copper compounds which precipitate on the carrier are as finely divided as possible. The loaded silicon dioxide is separated from the solution in conventional manner, for example by filtration, is dry-calcined at a temperature of about at least 350° C., preferably about at least 400° C., for example. The upper limit is determined such that the catalyst should not be deactivated and is effectively about 700° C., preferably about 600° C.

The reduction can be carried out rather straightforward using a hydrogen-containing gas, particular safety measures not being necessary, as in the case of the Cu/ZnO catalyst used in the art. The temperature should be at least 200° C. and preferably at least 300° C. for rapid reduction. The upper limit is again determined such that the catalyst cannot be deactivated by using too high temperatures. The upper limit during reduction is effectively about 600° C., preferably about 550° C. and more preferably about 500° C. The reduction can be carried out in a relatively short period of time whereas the reduction for the above-mentioned Cu/ZnO catalysts takes from 3 to 4 days.

The catalysts used according to the present invention have a much higher activity for the shift reaction at low temperatures than the Cu/ZnO catalysts used to this end according to the prior art. In the above-mentioned literature CATAL.REV.-SCI.Eng., 21 (2) 258 to 380 (1980) there is a graphic representation (FIG. 2) on page 297 in which the catalyst activity is shown as a function of the Cu/ZnO ratio. The highest activity is observed at Cu/ZnO ratio of about 0.4. If the catalysts according to the invention are used the activity is ten times higher at the same temperatures than with the best known Cu/ZnO catalysts.

A particular advantage of the present process is that it may also be carried out at high temperatures over long periods of time. The shift reaction is an exothermic reaction in which substantial quantities of heat are released. This means that the temperature of the reaction mixture in the reactor rises steeply, (that is when the reaction mixture flows through the catalyst bed as the reaction progresses). This does not have a detrimental effect if the catalysts according to the invention are used, as explained above. It is therefore preferable that the temperature at the outlet end of the catalyst bed be above about 270° C., more preferably above about 300° C. The catalysts are so stable that the temperature at the outlet of the reactor can even rise to 400° C., 450° C. or even 500° C. without substantial catalyst deactivation. It is therefore not necessary in the present process to decrease the temperature in the reactor by addition of steam. This is an exceptional advantage.

In the processes of the prior art which use the Cu/ZnO catalysts, the cooling or the maintaining of the temperature below about 260° C. is effected by supplying additional quantities of steam to the feed gas mixture, i.e. by using a substantial excess of steam above the quantity required for the reaction. This is obviously disadvantageous for economic reasons. In the present process, the quantity of steam may be substantially limited to the quantity which is required to convert the carbon monoxide which is contained in the inlet gas mixture into carbon dioxide with simultaneous formation of hydrogen.

The process according to the invention may be carried out in one stage and the temperature in the reactor, particularly at the end of the catalyst bed, as explained above, can rise steeply owing to the exothermic reaction. The process can also be carried out in several stages, more particularly in two stages as is known for the shift process in the prior art.

The present process has the advantage over abovementioned known high temperature shift catalysts based on iron oxide/chromium oxide, that small quantities of steam are used. If the above known Cu/ZnO catalysts are used, substantial excess of steam has to be used to prevent the carrier materials from reducing during the reaction. As the copper catalysts used according to the invention react with sulphur compounds, as is generally known for copper catalysts, the feed gas mixture for the present reaction should contain as little sulphur compounds as possible. The catalysts used according to the present invention have the advantage that, if they are loaded with sulphur, they could be regenerated by passing oxidizing agent-containing gases over them as is described in DE-A-31 31 257.

PRODUCTION EXAMPLE 1

Production of a copper catalyst. 172 g $Cu(NO_3)_2.3H_2O$ are dissolved in 1:4 l of de-ionized water. The pH value of the solution is fixed at 2 by addition of several drops of nitric acid. 106 g of finely divided silicon dioxide (AEROSIL 200V, registered Trade Mark) are then suspended in 1.5 l of de-ionized water and the pH value of this solution is fixed at 2 in the same manner. 120 g of urea are dissolved in 0.7 l of de-ionized water and the pH value is fixed at 2 in the same manner.

The silicon dioxide suspension, the urea solution and the copper nitrate solution are successively introduced into a vessel having a volume of 4.8 l, which has previously been heated to 90° C. De-ionized water is added to produce a total volume of 4.5 l. The suspension is continuously vigorously stirred.

On completion of precipitation, the loaded carrier is separated from the solution, washed, dried for 24 hours at 120° C. and crushed. 1 g of the catalyst is crushed into particles of about 0.8 mm and calcined under a nitrogen atmosphere for about 2 hours at a temperature rising to 450° C. and then for 2 hours 450° C. The catalyst is then cooled to a temperature below 100° C. and reduced at a temperature rising to 450° C. for 2 hours and then 450° C. for 1 hour in a mixure of 10% $H_2$ and balance nitrogen. The catalyst obtained in this manner contains about 30% by weight of metallic copper, based on the total weight of the catalyst. The specific surface area of the copper which is accesssible to the gas phase is about 63 $m^2$ per gram of the metallic copper.

Example 1

A gas mixture of 10% CO, 10% $H_2O$, or 10% CO, 5% $H_2O$, or 5% CO, 10% $H_2O$ respectively, remainder nitrogen is passed through a laboratory tubular reactor. 1 g of the catalyst obtained according to production example 1 is present in the tubular reactor. The average reaction temperatures are in the range of from 200° to 550° C. As this example is carried out in a small laboratory tubular reactor, the catalyst bed is substantially isothermic. The space velocity was 1800 $h^{-1}$. (Unless otherwise indicated, the percentages in the case of gases relete to the volume).

The results obtained are compiled in Table 1. The conversion shown therein is defined as the ratio of the quantity of $H_2$ which is formed to the quantity of $H_2$ in an equilibrium mixture of $H_2$, $H_2O$, CO and $CO_2$ based on the inlet gas mixture.

TABLE 1

| Temperature | Inlet gas mixture | | |
|---|---|---|---|
| | 10% CO, 10% $H_2O$ | 5% CO, 10% $H_2O$ | 10% CO, 5% $H_2O$ |
| 200 | 54% conversion | 52% conversion | 56% conversion |
| 300 | 80% conversion | 81% conversion | 80% conversion |

TABLE 1-continued

| Temperature | Inlet gas mixture | | |
|---|---|---|---|
| | 10% CO, 10% $H_2O$ | 5% CO, 10% $H_2O$ | 10% CO, 5% $H_2O$ |
| 400 | 94% conversion | 96% conversion | 97% conversion |
| 500 | 100% conversion | 100% conversion | 100% conversion |

The thermal stability of the catalyst is examined by passing a mixture of 10% CO and 10% steam, the remainder being nitrogen, over it for 100 hours at 450° C. The conversion is 100% throughout the entire period. No deactivation of the catalyst could be observed. After 6 hours at 550° C., still no deactivation could be observed.

Example 2

A catalyst obtained in accordance with production example 1 is used, which only has a copper loading of 10% by weight based on the total weight of the catalyst. The experiment was carried out similar to Example 1 a gas mixture of 10% CO and 10% steam, the remainder being nitrogen, being used. The average reaction temperature of the laboratory reactor is from 200° to 550° C. The space velocity is 1800 $h^{-1}$.

The results obtained are compiled in Table 2.

TABLE 2

| Temperature | |
|---|---|
| 200 | 78% conversion |
| 300 | 95% conversion |
| 400 | 100% conversion |
| 500 | 100% conversion |

PRODUCTION EXAMPLE 2

16.3 g of $Cu(NO_3)_2.3H_2O$ were dissolved in 0.5 l of deionized water. The pH value of the solution was fixed at 2 by addition of several drops of nitric acid. 10 g of finely divided silicon dioxide were suspended in 0.5 l of deionized water and the pH value of the suspension was adjusted to 2 by addition of several drops of nitric acid.

The vessel having a volume of 1.5 l used for precipitation was heated to 90° C. The silicon dioxide suspension was poured in and 300 ml of a urea solution containing 20 g of urea were subsequently added. During composition of the urea, the pH value was constantly held at 5 by automatically controlled injection of nitric acid. After the pH value of 5 had been achieved, the copper nitrate solution was injected under the surface of the suspension at an injection rate of 0.4 ml per minute. The suspension was vigorously stirred throughout this. On completion of the injection, the loaded carrier was separated from the solution, washed and dried for 24 hours at 120° C. and then pelleted. 1 g of the catalyst was cut into pieces of about 0.8 mm and calcined and reduced as described in production example 1. The catalyst contained 30% by weight of copper, based on the total weight of copper and silicon dioxide.

Example 3

The process is carried out as in Example 1 using 1 g of the catalyst described in production example 2. The inlet gas mixture consists of 10% steam the remainder being nitrogen. The results obtained are compiled in Table 3.

TABLE 3

| Temperature | |
|---|---|
| 200 | 76% conversion |
| 300 | 90% conversion |
| 400 | 100% conversion |
| 500 | 100% conversion |

The thermal stability of the catalyst used in this Example was examined by passing through a mixture of 10% by volume CO, 10% by volume steam, the remainder being nitrogen, for 6 hours at 550° C. During this time, no deactivation of the catalyst could be observed.

Example 4

A cylindrical stainless steel reactor tube was filled with a sample of the catalyst, which also was utilised in Example 2. The dried catalyst was pulverised in a mortar and subsequently pressed at 800 kg cm$^{-2}$ into pellets of dimensions between 1.4 and 2.8 mm. The catalyst bed was 1.0 cm in diameter and 15 cm in height. The catalyst sample in the reactor contained 1.5 g of metallic copper. Pretreatment of the catalyst was carried out in situ. The catalyst was calcined in a nitrogen flow at temperatures gradually increasing from 25° to 450° C. by 25 degrees per hour. After half an hour at 450° C. the catalyst was cooled down to 100°. Subsequently the catalyst was reduced in a flow of 10% $H_2$, 90% $N_2$ at temperatures gradually (25 degrees h$^{-1}$) increasing from 100° to 450° C. After half an hour at 450° C. the catalyst was cooled down to 275° C. in nitrogen.

Next a reaction mixture composed of 10% CO, 10% $H_2O$ and 80% $N_2$ at a total pressure of 5 bar was passed over the catalyst. The space velocity was about 1250 h$^{-1}$. The reactants were heated in a separate preheater, such that the temperature at the entry of the reactor was 275° C. The conversion then measured, defined as vol.-%$CO_2$/(vol.%CO+vol.%$CO_2$) (all volume percentages measured in the product gas flow), amounted to 70%. After 300 h of steady operation the $H_2O$/CO-ratio of the gas mixture was increased. The feed gas had changed to 9.4% CO, 15.0% $H_2O$ and 75.6% $N_2$. Next the temperature of the gas entering the reactor was raised to 375° C. Over a period of 1300 hours from the beginning of the experiment the CO conversion was determined to be constant at 82%. This is a convincing proof of the very good thermostability of the applied catalyst under process conditions.

PREPARATION EXAMPLE 3

A supported copper catalyst was prepared using the well-known method of impregnation followed by drying. As carrier a non-microporous silica was used (AEROSIL 200 Degussa). The dried product which contained 25% by weight of copper was pressed (800 kg/cm$^2$) into pellets of dimensions between 1.4 and 2.8 mm. The catalyst was calcined in a nitrogen flow at temperatures gradually increasing from 50° to 400° C. After half an hour at 400° C. the catalyst was cooled to 100° C. and subsequently reduced in a mixture of 10% of $H_2$ and 90% $N_2$. During reduction the temperature was raised gradually (50° C. per hour) from 100° to 300° C. The reduction procedure was stopped after the catalyst had been kept for half an hour at 300° C.

Example 5

A number of differently prepared catalysts was tested for their actitivity in the water-gas shift reaction. For the experiments the equipment described in Example 4 was used. In this experiment the catalyst bed was 1.0 cm in diameter and 15 cm in height. Pretreatment of the catalyst was carried out in situ. In the activity measurements a mixture of 9.7% CO and 13.0% $H_2O$, balance nitrogen was passed through the catalyst. The space velocity applied was about 1250 h$^{-1}$ at a total pressure of 5 bars. The reactants were tested in a separate preheater to such a level that the feed entered the reactor at either 250° or 350° C. At both temperatures the CO-conversion was measured. To establish the thermostability of the catalysts the measurements at 350° C. were continued for at least 200 h. All conversions measured are represented in Table 4. Catalysts Cu-10 and Cu-65 were prepared using the method of deposition-precipitation from a homogenous solution (van der Meijden). Both catalysts displayed a high activity, despite the rather small copper loading of catalyst Cu-10. Also the thermostability has been described in Preparation Example 1.

Catalyst Cu-1 was prepared and preheated as in Preparation Example 3. This catalyst showed a fairly high activity at both 250° and 350° C. However, the thermostability at 350° C. was much smaller than of catalyst Cu-10 and Cu-65.

After the experiments all catalysts were examined in the electron microscope. It was found that the activity for the carbon monoxide shift conversion was proportional to the amount of copper being present in the form of particles of dimensions smaller than 10 nm.

TABLE 4

| Catalyst | Preparation Example | Copper Loading | Conversion at 275° C. % | Conversion at 375° C. | |
|---|---|---|---|---|---|
| | | | | initial | after 200 h |
| Cu-10 | 1 | 10 | 73 | 79 | 78 |
| Cu-65 | 1 | 40* | 93 | 86 | 86 |
| Cu-1 | 3 | 25 | 60 | 79 | 73 |

*not accurately known, but certainly above 30%

What we claim is:

1. A process for the production of hydrogen with simultaneous formation of carbon dioxide by reacting carbon monoxide with steam at elevated temperatures in the presence of catalysts containing more than 1% by weight of copper based on the total weight of the catalyst, characterized in that the catalyst consists essentially of a refractory oxidic carrier having a high specific surface area of more than 30 m$^2$/gram loaded with metallic copper having a high specific surface area accessible to the gas phase which amounts to at least 20 m$^2$/gram of the metallic copper and said copper having a purity of more than 90% by weight, a fraction of at least 1% by weight of said metallic copper, calculated as % by weight of the total weight of the copper and carrier, being present as particles of a size of less than 20 nm, said catalyst consisting of less than 15% zinc or its oxide by weight of the active metal plus carrier of the catalyst.

2. The process of claim 1, in which the carrier is silica.

3. The process of claim 2, in which the silica has a purity of more than 95% by weight.

4. The process according to claim 1, in which the metallic copper is of a purity of more than 95% by weight.

5. The process according to claim 4, in which the metallic copper is of a purity of more than 98% by weight.

6. The process according to claim 5, in which the metallic copper is of a purity of more than 99.5% by weight.

7. The process according to claim 1, characterized in that at least 5% by weight of said metallic copper calculated as % by weight of the total weight of the copper and carrier being present as particles of a size of less than 20 nm.

8. The process of claim 7, characterized in that a fraction of at least 5% by weight of said metallic copper calculated as % by weight of the total weight of the copper and carrier is present as particles of a size of less than 10 nm.

9. The process of claim 8, characterized in that at least 10% by weight of said metallic copper calculated as % by weight of the total weight of the copper and carrier is present as particles of a size of less than 10 nm.

10. The process according to claim 1, characterized in that the catalyst was obtained by precipitating copper compounds in a solution containing copper ions and a refractory oxidic carrier having a high specific surface area which was suspended in finely divided form, with heating and a period of intensive stirring by reaction with hydroxyl ions at a pH value of from 3.6 to 6 and the loaded carrier was separated from the solution, dried, calcinated and reduced.

11. The process according to claim 1, characterized in that the temperature at the outlet end of the catalyst bed is above about 300° C.

12. The process according to claim 11, characterized in that the temperature at the inlet of the gas mixture in the catalyst bed is above about 300° C.

13. Process according to claim 1 wherein said active metal plus carrier includes less than 10% zinc or its oxide by weight of the total weight of the catalyst.

14. Process according to claim 13 wherein said active metal plus carrier includes less than 5% zinc or its oxide by weight of the total weight of the catalyst.

15. Process according to claim 1 wherein zinc and its oxide are essentially absent from the active metal and carrier of the catalyst.

16. Process according to claim 7 wherein said percentage of copper present as particles of less than 20 nm is 10%.

17. Process according to claim 16 wherein said percentage of copper present as particles of less than 20 nm is 20%.

18. The process of claim 8 wherein at least 5% by weight of metallic copper is present as particles of a size of less than 7 nm.

19. The process of claim 9 wherein said 10% by weight of of metallic copper is present as particles of less than 7 nm.

20. The process of claim 9 wherein at least 20% by weight of said metallic copper is present as particles of less than 10 nm.

21. The process of claim 20 wherein at least 20% of metallic copper is present as particles of 7 nm.

* * * * *